(12) United States Patent
Kim et al.

(10) Patent No.: US 6,833,053 B2
(45) Date of Patent: Dec. 21, 2004

(54) THIN FILM BONDING METHOD AND OPTICAL DISK BONDING METHOD AND APPARATUS USING THE SAME

(75) Inventors: Myong Ryong Kim, Anyang (KR); Tae Hee Jeong, Seongnam (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 10/058,600

(22) Filed: Jan. 25, 2002

(65) Prior Publication Data

US 2002/0100543 A1 Aug. 1, 2002

(30) Foreign Application Priority Data

Jan. 29, 2001 (KR) .......................................... 2001-4088

(51) Int. Cl.[7] .............................................. B32B 35/00
(52) U.S. Cl. .................... 156/379.8; 156/285; 156/286; 156/295; 156/556; 156/273.7; 156/275.5; 156/275.7
(58) Field of Search ................................ 156/285–286, 156/295, 556, 272.4, 272.2, 273.3, 273.7, 379.6, 379.8, 275.5, 275.7; 428/65.2; 369/286; G11B 7/24, 7/26

(56) References Cited

U.S. PATENT DOCUMENTS 6,254,716 B1 * 7/2001 Russell et al. .............. 156/286

FOREIGN PATENT DOCUMENTS

| JP | 8106655 | 4/1996 | ............ G11B/7/26 |
| JP | 9297942 | 11/1997 | ............ G11B/7/26 |

* cited by examiner

Primary Examiner—Blaine Copenheaver
Assistant Examiner—Jessica Rossi
(74) Attorney, Agent, or Firm—Lee, Hong, Degerman, Kang & Schmadeka

(57) ABSTRACT

A thin film bonding method for bonding a thin film to an target surface by using an adhesive agent includes the steps of: applying the adhesive agent on the target surface and mounting the thin film on the adhesive agent; applying a a fluid pressure on the target surface and the thin film from a central portion to an circumference according to lapse of time, so as to allow the thin film and the target surface to be bonded partially; and hardening the adhesive agent. The compressive force using the fluid having a magnetic force in the thin film bonding proceeds in a spiral form from the central portion to the circumference of the disk according to lapse of time, so that the air trap existing in the adhesive agent can be effectively removed, and thus, the flatness of the disk can be prevented from degradation due to the air trap.

6 Claims, 8 Drawing Sheets

THIN FILM BONDING METHOD AND OPTICAL DISK BONDING METHOD AND APPARATUS USING THE SAME

BACKGROUND OF THE INVENTION

1. Field of the Invention

The present invention relates to a thin film bonding method, and more particularly, to a thin film bonding method and a bonding method and apparatus of an optical disk using the same.

2. Description of the Background Art

Recently, following the compact disk (CD) generalized as an optical recording medium, a digital versatile disk (DVD) has been proposed with its standardized size, and various products such as a DVD-ROM, a DVD-RAM, a DVD-R, a DVD-RW and a DVD+RW are becoming common.

Such DVD has a remarkably improved recording density compared to the existing CD and is expected to be widely spread.

For example, the capacity of the DVD is about 4.7 Giga bytes (GB) on the basis of a single-sided single layer, storing a movie of about 2 hours in a VHS class.

Among the optical recording mediums, as shown in FIG. 1, a reproduction-exclusive optical recording medium includes a first substrate 2 having an information record layer with a pit pattern and a reflection film, and a second substrate 6 attached to the first substrate 2 through an adhesive agent 4 applied at an upper portion of the first substrate 2.

The first substrate 2 is a light transmission layer, typically made of a co-polymer substance such as a polycarbonate, and has a thickness of 0.6 mm.

One side of the first substrate 2 is used as an information record layer for recording information by forming the pit pattern, a guide groove, or the like, and the reflection film is formed on the information record layer to reflect a laser beam (LB) made incident through the first substrate 2.

As a dummy substrate, the second substrate 6 is made of the same material as that of the first substrate 2, serving as a protection layer for preventing deformation of the first substrate 2 and a degradation of the reflection film.

The second substrate 6 also has the thickness of about 0.6 mm the same as the first substrate 2 and bonded onto the reflection film of the first substrate 2 by an adhesive agent 4.

Accordingly, the optical recording medium, having the structure that the second substrate 6 serving as a protection layer and the first substrate 2 having information are bonded, have the thickness of 1.2 mm, and formed as a disk type having the diameter of 12 cm.

In the optical recording medium, in order to record information or read information from the medium, a laser beam (LB) generated from an optical pick-up (not shown) is transmitted through the first substrate 2 and irradiated on the information record layer.

In such a case, a size of a beam spot formed on the information record layer determining a record density of the optical recording medium is in proportion to a wavelength of a corresponding light source contained in the optical pick-up and in inverse proportion to a numerical aperture (NA) of the objective lens.

Accordingly, in order to improve a record density of the optical recording medium, it is essential to use a light source having a short wavelength with respect to the thickness of the first substrate 2 and an objective lens having a large numerical aperture.

However, in case of increasing the numerical aperture of the objective lens, since a coma aberration of the optical disk to a tilt is drastically increased in proportion to the third power ($NA^3$) of the numerical aperture, a reliability of the recorded optical information is degraded.

In addition, as shown in FIGS. 2A and 2B, the coma aberration is increased in proportion to the fourth power ($t^4$) of the thickness of transparent substrates 10 and 12 transmitting the light.

The coma aberration will now be described in detail with reference to FIGS. 2A and 2B.

As shown in FIGS. 2A and 2B, when the laser beam (LB) focussed by the objective lens (OL) passes through a first substrate 10 (having a first thickness) of FIG. 2A and a first substrate 12 (having a second thickness) of FIG. 2B, respectively, a tilt angle (θ1) and an angle (θ2) due to the laser beam (LB) refracted inside the substrates are formed. If the substrates 10 and 12 are made of the same material, have the same tilt angle (θ1), and have the same thickness (i.e., the first thickness=the second thickness), the angles (θ2) refracted inside the substrates 10 and 12 will also be formed to be the same, so that a focus for each substrate 10 and 12 is formed at the same position. However, if the substrates 10 and 12 have different thickness (i.e., the first and the second thickness are different), the position (f) of the focus forming an image varies depending on the thickness of the substrates 10 and 12.

Accordingly, as for the laser beam (LB) sensitive to the thickness of its transmitting substrate has a greater position deflection (δ1) when it transmits the first substrate 10 than a position deflection (δ2) when it transmits the tilted thin first substrate 12.

In this manner, if the irradiation position of the laser beam (LB) is deviated from a normal position after passing the first substrate 12, a bad effect is made on a focusing control or a tracking control, resulting in that a critical error is generated in recording or reproducing information.

In order to prevent the problems, for an optical recording medium having a recording capacity of higher than about 20 GB, an objective lens having a high numerical aperture and an optical recording medium having a thin light transmission layer substrate has been proposed.

In the proposal, as shown in FIG. 3, the optical disk includes a first substrate 14 forming a protection layer and a thin second substrate 18 bonded on the first substrate 14 by means of an adhesive agent 16 and having an information record layer formed with a pit pattern and a reflection film.

In the construction, the second substrate 18 transmitting the laser beam (LB) has the thickness of 0.1 mm in order to minimize dependence on the substrate thickness of the coma aberration.

The first substrate 14 bonded onto the second substrate 18 through the adhesive agent 16 is a protection layer and has a thickness of 1.1 mm for a compatibility with the existing optical disks having the thickness of 1.2 mm.

However, even though the optical disk having the thin second substrate 18 as a light transmission layer can minimize generation of the coma aberration, since the second substrate 18 is too thin to be put to a practical use with its poor productivity. The reason is because it is not easy to bond the extremely thin second substrate 18 onto the first substrate 14.

The bonding method of the optical disk as shown in FIG. 3 will now be described with reference to FIGS. 4 and 5.

First, in a first step (S20), the first substrate 14 is mounted on a disk type optical disk support member 15 combined at an upper portion of a rotational shaft 17 included in an optical disk bonding apparatus 19.

In a second step (S22), the first substrate 14 mounted on the optical disk support member 15 is rotated, on which a liquid adhesive agent hardened by ultraviolet rays is applied to form a layer of adhesive agent 16.

In a third step (S24), the thin second substrate 18 having a reflection film is mounted on the adhesive agent layer 16.

In a fourth step (S26), pressure is applied at one time onto the entire surface of the second substrate 18, and due to the weight of the second substrate 18, the ultraviolet hardening resin 16 spreads relatively uniformly at the interface of the first substrate 14 and the second substrate 18.

In a fifth step (S28), ultraviolet rays are irradiated to harden the adhesive agent layer 16.

However, in the conventional optical disk bonding method as described above, since the entire surface of the second substrate 18 is pressurized at one time, air is trapped between the first substrate 14 and the second substrate 18 or the thickness of the adhesive agent layer 16 is uneven.

Large air bubbles due to the air trapped between the first substrate 14 and the second substrate 18 degrades the flatness of the optical disk, that is, one of a record density enhancement conditions of the optical disk, and small air bubbles which form due to a temperature change also worsens the flatness of the optical disk.

The flatness degradation of the optical disk causes the optical disk to be bent, a tilt or a vibration of the optical disk or dispersion of a light spot, making a bad influence on the operation of the recording and reproducing information.

SUMMARY OF THE INVENTION

Therefore, an object of the present invention is to provide a thin film bonding method that is capable of uniformly bonding a thin film.

Another object of the present invention is to provide a bonding method and apparatus of an optical disk that are capable of bonding thin film with a uniform thickness without an air trap.

To achieve these and other advantages and in accordance with the purpose of the present invention, as embodied and broadly described herein, there is provided a thin film bonding method for bonding a thin film to a target surface by using an adhesive agent, including the steps of:

(A) applying the adhesive agent onto the target surface and placing the thin film onto the target surface;

(B) applying a fluid pressure onto the target surface and the thin film from a central portion to an circumference thereof, so as to gradually proceed the bonding of the thin film and the target surface with the lapse of the time; and (C) hardening the adhesive agent.

To achieve the above objects, there is further provided a bonding method of an optical disk for bonding a thin film on a first substrate, including the steps of:

(A) placing a thin film on the first substrate with an adhesive agent therebetween;

(B) rotating the first substrate and a thin film while applying a fluid pressure to the first substrate and a thin film according to lapse of time from the central portion to the circumference thereof to allow bonding between the first substrate and a thin film to proceed in a spiral direction thereof; and (C) hardening the adhesive agent.

To achieve the above objects, there is further provided a bonding apparatus of the optical disk including: a rotational shaft integrally coupled to a drive motor generating a rotational force; a disk support member coupled to one side of the rotational shaft, on which a first substrate is mounted; a first nozzle positioned at a portion of the upper side of the disk support member to supply an adhesive agent onto an upper surface of the first substrate mounted at the disk support member; a pressure supplying means for applying a fluid pressure to the first substrate and a thin film mounted on the first substrate with the adhesive agent therebetween according to lapse of time from the central portion to its circumference to allow bonding between the first substrate and a thin film to proceed in a spiral; and irradiation means for irradiating ultraviolet rays to harden the adhesive agent applied between the first substrate and the thin film.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
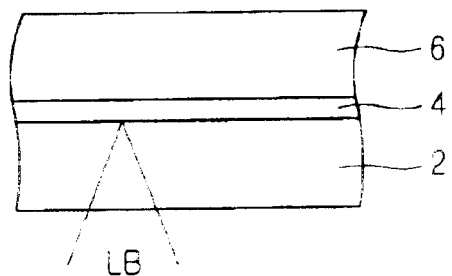
FIG. 1 is a schematic view showing the structure of a general optical disk.
Figure 2A:
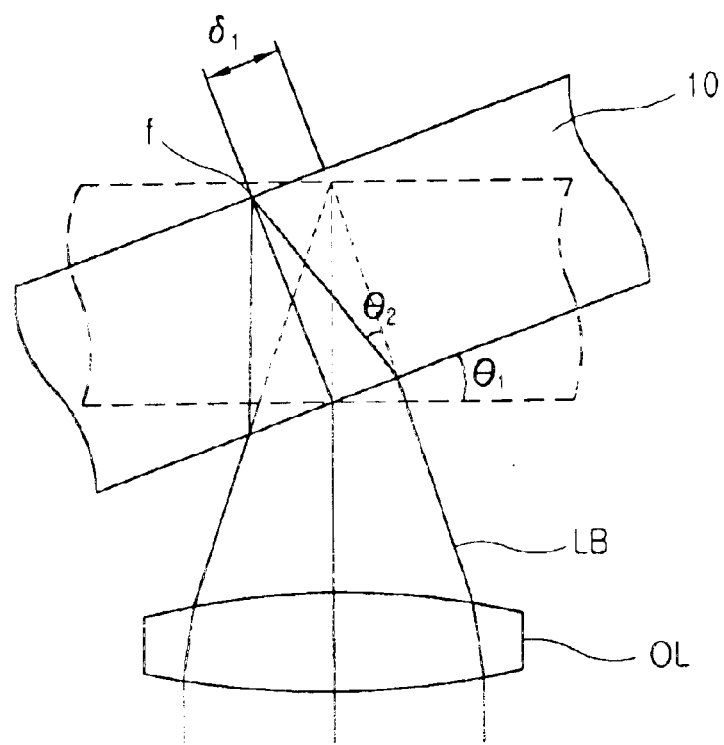
FIGS. 2A and 2B are schematic views showing dependence on a substrate thickness of a coma aberration generated in the optical disk.
Figure 2B:
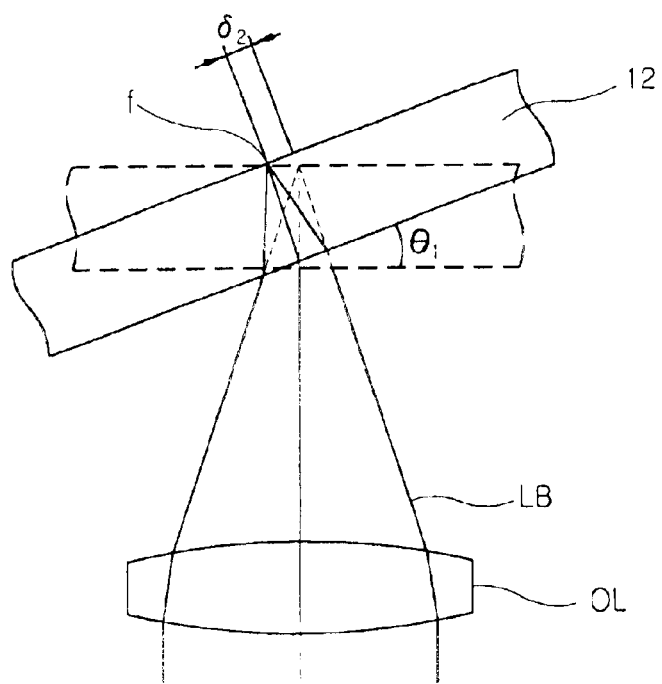
Figure 3:
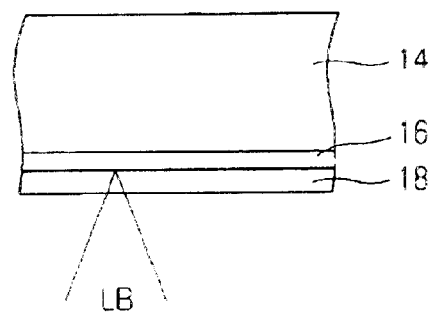
FIG. 3 is a schematic view showing a structure of an optical disk proposed to solve the coma aberration generated in the general optical disk.
Figure 4:
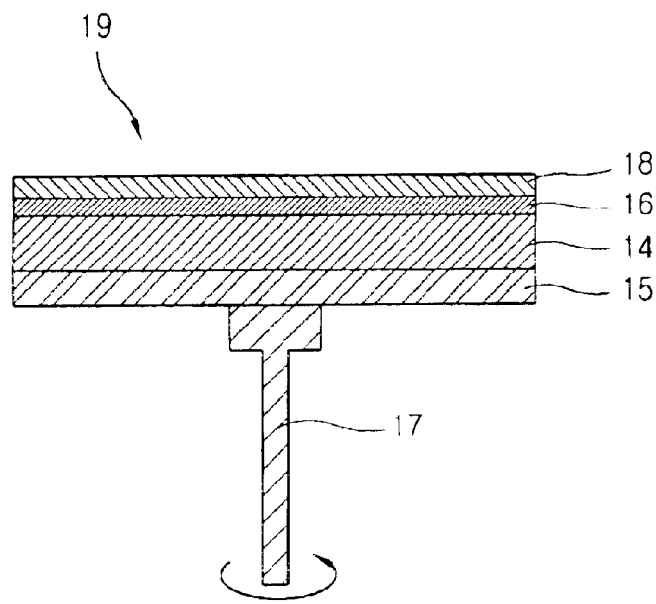
FIG. 4 is a schematic view showing a bonding apparatus of the optical disk of FIG. 3.
Figure 5:
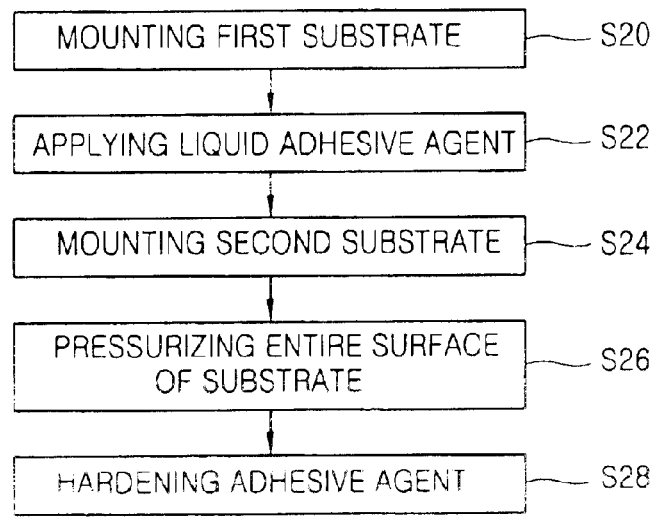
FIG. 5 is a flow chart of a bonding method of the optical disk of FIG. 3.
Figure 6:
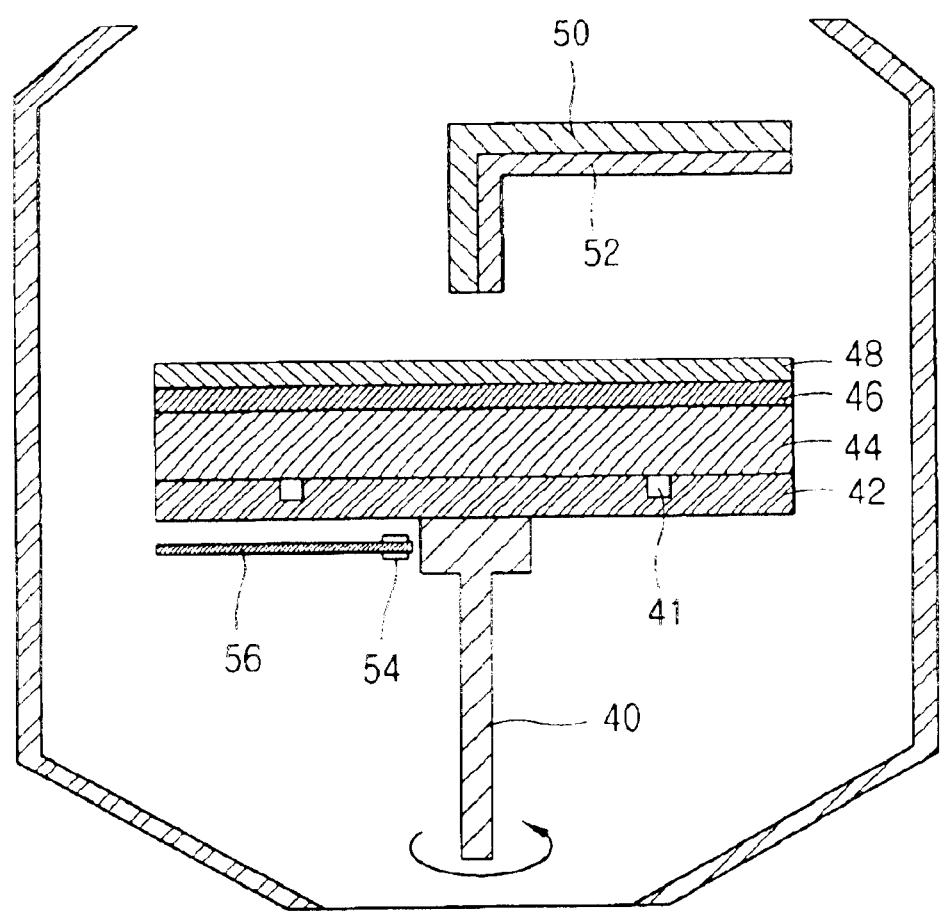
FIG. 6 is a schematic view showing a bonding apparatus of an optical disk in accordance with one embodiment of the present invention.

FIG. 6 is a schematic view showing a bonding apparatus of an optical disk in accordance with one embodiment of the present invention.

As shown in FIG. 6, a bonding apparatus of an optical disk includes: a rotational shaft 40 integrally coupled to a drive motor (not shown) generating a rotational force; a disk support member 42 coupled at one side of the rotational shaft 40, on which a first substrate 44 is mounted; a first nozzle 50 positioned at one upper side of the disk support member to supply an adhesive agent 46 hardened by ultraviolet rays onto an upper surface of the first substrate 44 mounted at the disk support member 46; a second nozzle 52 positioned at one side of the upper portion to supply a magnetic suspension onto an upper surface of a thin second substrate 48 bonded on the first substrate 44; an electromagnet 54 positioned adjacent to the bottom surface of the lower portion of the disk support member 42; and a guide rail 56 having the electromagnet 54 and formed such that the electromagnet 54 can be moved in a radial direction of the disk support member 42.

As the electromagnet 54, a permanent magnet may be used to simplify an electric construction of the bonding apparatus.

A method for bonding a thin film by using the bonding apparatus of an optical disk of the present invention will now be described with reference to FIG. 7.

First Step (S30): Mounting the First Substrate:

The first substrate 44 is mounted at an upper surface of the disk support member 42. At this time, the first substrate 44 mounted at the upper surface of the disk support member 42 is instantly fixed thereto by a vacuum suction force generated from a plurality of vacuum suction holes 41 formed at certain portions of the disk support member 42.

Second Step (S32): Applying Liquid Adhesive Agent:

According to the rotation of the drive motor (not shown), the first substrate 44 mounted at the upper surface of the disk support member 42 is rotated, during which the liquid adhesive agent 46 is supplied thereto through the first nozzle 50 positioned at a center of the upper portion of the first substrate 44.

At this time, the liquid adhesive agent 46 spreads from the central portion to the circumference of the first substrate 44 by the centrifugal force according to the rotational force and viscosity of the adhesive agent 46, to be applied. The thickness of the liquid adhesive agent 46 is determined according to combination of a rotation speed of the first substrate 44 being rotated, the viscosity of the adhesive agent and the rotation time.

Third Step (S34): Mounting the Second Substrate:

A thin second substrate 48 is mounted at the upper surface of the first substrate 44 with the adhesive agent 46 applied thereon.

Fourth Step (S36): Supplying the Magnetic Suspension:

According to the rotation of the drive motor (not shown), a magnetic suspension or a magnetic fluid containing magnetic file particles is supplied through the second nozzle 52 positioned at the center of the upper portion of the second substrate 48 while the second substrate 48 mounted on the upper surface of the first substrate 44 is being rotated.

As a result, the magnetic suspension or the magnetic fluid is uniformly applied at the upper surface of the second substrate 48 being rotated.

Fifth Step (S38): Driving the Electromagnet:

While the rotation in the fourth step (S36) is continuously maintained, the electromagnet 54 positioned adjacent to the bottom surface of the lower portion of the disk support member 42 is linearly conveyed from the central portion to the circumference of the disk support member 42 through the guide rail 56.

During the process, a magnetic force generated by the magnetic suspension or the magnetic fluid applied on the electromagnet 54 and the second substrate 48 works vertically on the surface of the first and the second substrates 44 and 48.

Accordingly, a compressive force is generated according to the magnetic force between the upper surface of the second substrate 48 and the lower portion of the disk support member 42 at the first substrate 44 and the second substrate 48.

Thanks to the compressive force, the first substrate 44 and the second substrate 48 are firmly bonded.

Especially, the compressive force generated due to the magnetic force of the electromagnet 54 linearly conveyed from the central portion to the circumference of the disk support member 42 along the guide rail 56 proceeds in a spiral from the central portion to the circumference of the disk support member 42.

The compressive force according to the magnetic force distributed in the spiral form pushes the air or the air bubble trapped at the adhesive agent layer 46 applied between the first substrate 44 and the second substrate 48 toward the circumference of the adhesive agent 46, that is, a circumference of the disk support member 42, so that the first substrate 44 and the second substrate 48 are firmly bonded at a high speed without a trap of air.

Sixth Step (S40): Removing a Magnetic Suspension:

After the first and the second substrates 44 and 48 are completely bonded, the magnetic suspension or the magnetic fluid applied at the upper surface of the second substrate 48 is removed.

Removal of the magnetic suspension or the magnetic fluid applied at the upper surface of the second substrate 48 is made by completely moving the electromagnet to the outside of the disk support member 42 and removing the magnetic field formed at the disk support member 42 and between the substrates 44 and 48.

After the electromagnet 54 is moved, the magnetic suspension or the magnetic fluid has fluidity, and by rotating the disk support member 42, the magnetic suspension or the magnetic fluid is quickly removed. The thusly-removed magnetic suspension or the magnetic fluid is collected in a separate container and recycled.

Seventh Step (S42): Hardening the Adhesive Agent:

Ultraviolet rays are irradiated through an ultraviolet ray discharge lamp (not shown) formed at an upper side of the second substrate 48 in order to harden the adhesive agent 46 interposed between the first substrate 44 and the second substrate 48.

In this manner, in the bonding method and apparatus of an optical disk in accordance with one embodiment of the present invention, the compressive force according to the magnetic force using the magnetic suspension or the magnetic fluid and electromagnet or the permanent magnet is applied from the central portion to an circumference of the disk according to lapse of time, so that the air trap existing at the adhesive agent layer 46 between the first substrate 44 and the second substrate 48 is removed.

Accordingly, the flatness degradation of the disk due to the air trap can be prevented.

Figure 7:
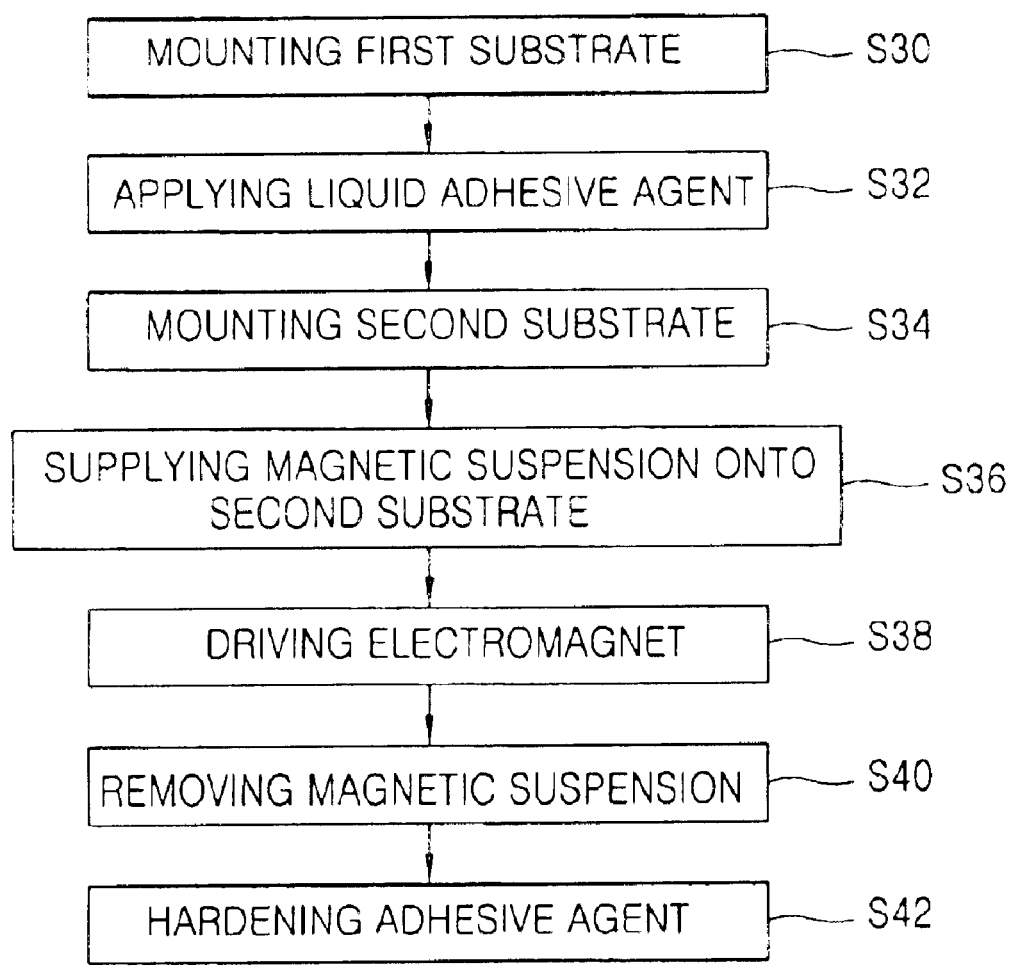
FIG. 7 is a flow chart showing a bonding method of an optical disk in accordance with one embodiment of the present invention.

In addition, the bonding method and apparatus of the optical disk of the present invention is not limited to the method for bonding one piece of second substrate 48 to the first substrate 44 as shown in FIGS. 6 and 7, and easily adopted to a bonding method for a multi-layer.

In case of bonding of a multi-layer, after an adhesive agent is applied between each layer in the same manner as described above, a magnetic suspension or a magnetic fluid is applied at the uppermost layer, and then a compressive force according to a magnetic force with an electromagnet or a permanent magnet that is able to generate a larger magnetic field is applied from the central portion to the circumference, to thereby bond them.

The bonding method and apparatus of the optical disk in accordance with another embodiment of the present invention will now be described with reference to accompanying drawings.

Figure 8:
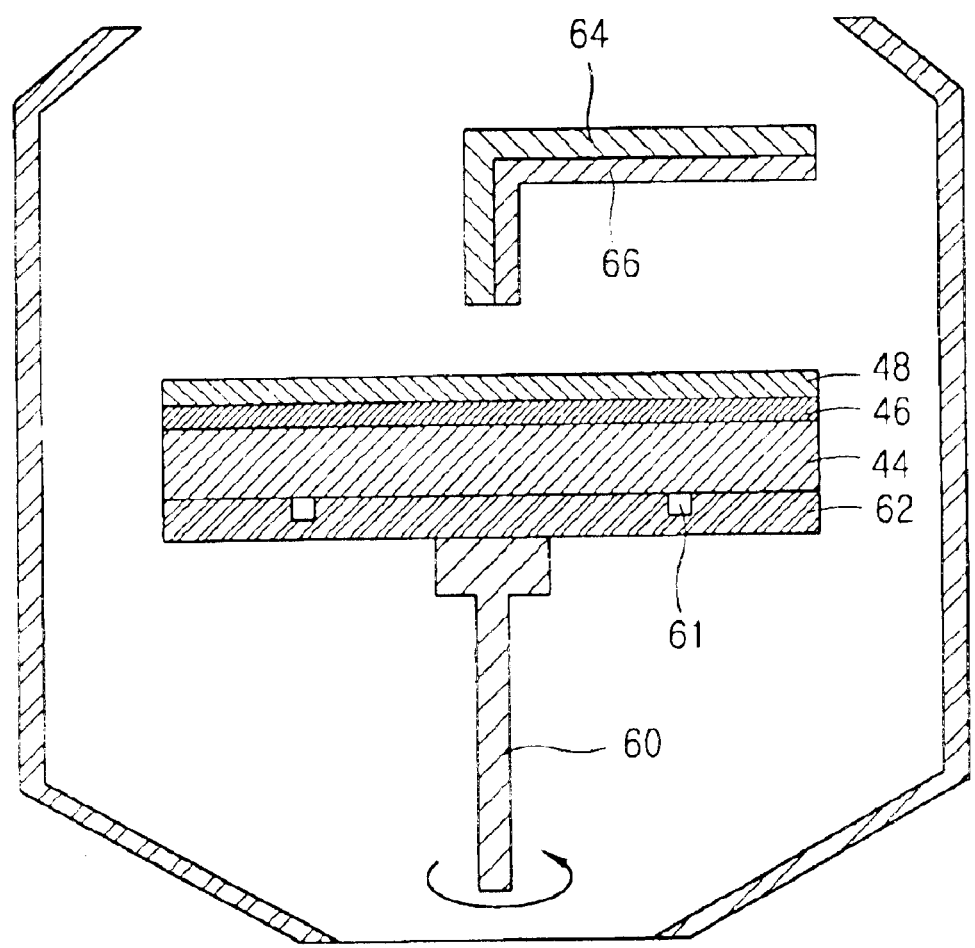
FIG. 8 is a schematic view showing a bonding apparatus of an optical disk in accordance with another embodiment of the present invention.

FIG. 8 is a schematic view showing a bonding apparatus of an optical disk in accordance with another embodiment of the present invention.

As shown in FIG. 8, a bonding apparatus of an optical disk in accordance with another embodiment of the present invention includes a rotational shaft 60 integrally coupled to a drive motor (not shown) generating a rotational force; a disk support member 62 coupled to one side of the rotational shaft 60, on which a first substrate 44 is mounted; a first nozzle 64 positioned at one side of an upper surface of the first substrate 44 mounted on the disk support member 62 in order to supply an adhesive agent 46 that is hardened by ultraviolet rays; and a second nozzle 66 positioned at one side of an upper surface of a second substrate 48 bonded on the first substrate 44 in order to supply pneumatic pressure from the central portion to the circumference.

Figure 9:
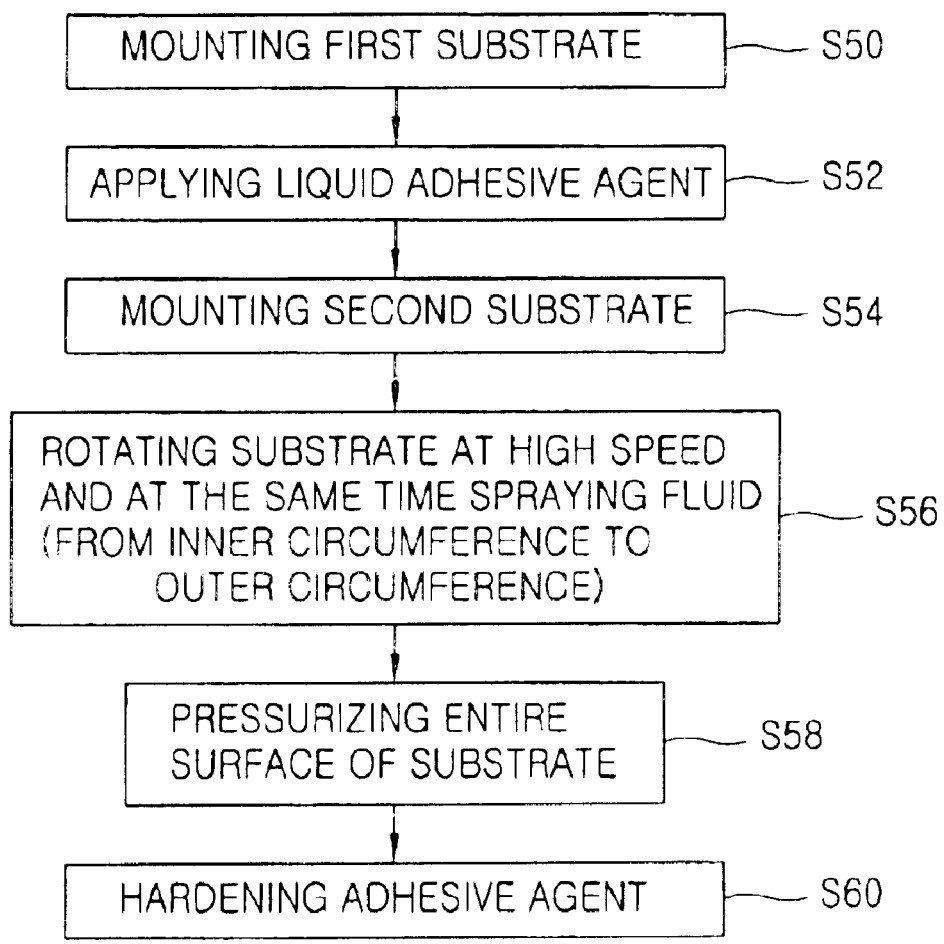
FIG. 9 is a flow chart of one bonding method of an optical disk in accordance with another embodiment of the present invention.

A method for bonding a thin film by using the optical bonding apparatus in accordance with another embodiment of the present invention as shown in FIG. 8 will now be described with reference to FIG. 9.

First Step (S50): Mounting the First Substrate:

The first substrate 44 is mounted at an upper surface of the disk support member 62. At this time, the first substrate 44 mounted at the upper surface of the disk support member 62 is instantly fixed to the disk support member 62 owing to a vacuum suction force generated from a plurality of vacuum suction holes 61 formed at certain portions of the disk support member 42.

Second Step (S52): Applying Liquid Adhesive Agent:

According to the rotation of the drive motor (not shown), the first substrate 44 mounted at the upper surface of the disk support member 62 is rotated, during which the liquid adhesive agent 46 is supplied thereto through the first nozzle 64 positioned at a center of the upper portion of the first substrate 44.

At this time, the liquid adhesive agent 46 spreads from the central portion to the circumference of the first substrate 44 by the centrifugal force according to the rotational force and viscosity of the adhesive agent 46, to be applied. The thickness of the liquid adhesive agent 46 is determined according to combination of a rotation speed of the first substrate 44 being rotated, the viscosity of the adhesive agent and the rotation time.

Third Step (S54): Mounting the Second Substrate:

A thin second substrate 48 is mounted at the upper surface of the first substrate 44 with the adhesive agent 46 applied thereon.

Fourth step (S56): Rotating the Substrate at a High Speed and at the Same Time Spraying Compression Air:

The mounted second substrate 48 is rotated at a high speed to spray the compression air through the second nozzle 64 to pressurize the second substrate 48.

In such a case, the second nozzle 64 spraying the compression air is linearly conveyed from the central portion to the circumference of the disk, and as the disk support member 62 is rotated at a high speed, the distribution of the compression pneumatic pressure formed at the upper surface of the second substrate 48 has a spiral form.

Thanks to the compression pneumatic pressure applied in the spiral form, the air or air bubbles trapped at the adhesive agent layer 46 between the first substrate and the second substrate 48 is or are thrust out toward the circumference of the adhesive agent 46, that is, toward the circumference of the disk 62, so that the first substrate 44 and the second substrate 48 are firmly bonded at a high speed without an air trap.

In order to effectively remove an air trap, it is preferred to allow a portion of the applied pneumatic pressure and the formerly applied portion to be overlapped. This is achieved by suitably controlling the rotation speed of the disk support member 62 and the movement speed of the second nozzle 66.

In addition, in order to uniformly apply the pneumatic pressure from the central portion and the circumference of the disk, the rotation speed of the drive motor (not shown) for rotating the disk support member 62 is controlled to be increased or decreased in a constant linear velocity (CLV) method.

Fifth step (S58): Pressurizing the Entire Surface of the Substrate:

When the pneumatic pressure applied due to the compression air reaches the circumference of the second substrate 48, the highly pressurized air instantly pressurizes the entire surface of the second substrate 48.

Sixth Step (S60): Hardening an Adhesive Agent:

Ultraviolet rays are radiated through the ultraviolet ray discharge lamp (not shown) formed at an upper side of the second substrate 48 in order to harden the adhesive agent 46 interposed between the first substrate 44 and the second substrate 48.

In addition, as a fluid for generating the pressure, nitrogen may be used instead of air. Using nitrogen is advantageous in that an ultraviolet ray hardening resin, the adhesive agent 46, is prevented from being oxidized, so that the adhesive agent 46 is effectively hardened by the ultraviolet rays.

In the bonding method and apparatus of an optical disk in accordance with another embodiment of the present invention as described above, since the compressive force owing to the pneumatic pressure is applied from the central portion to the circumference of the disk according to lapse of time, the air trap existing at the adhesive agent layer 46 between the first substrate 44 and the second substrate 48 is removed.

The bonding method of an optical disk using the optical disk bonding apparatus as illustrated in FIG. 8 will now be described with reference to FIG. 10.

Figure 10:
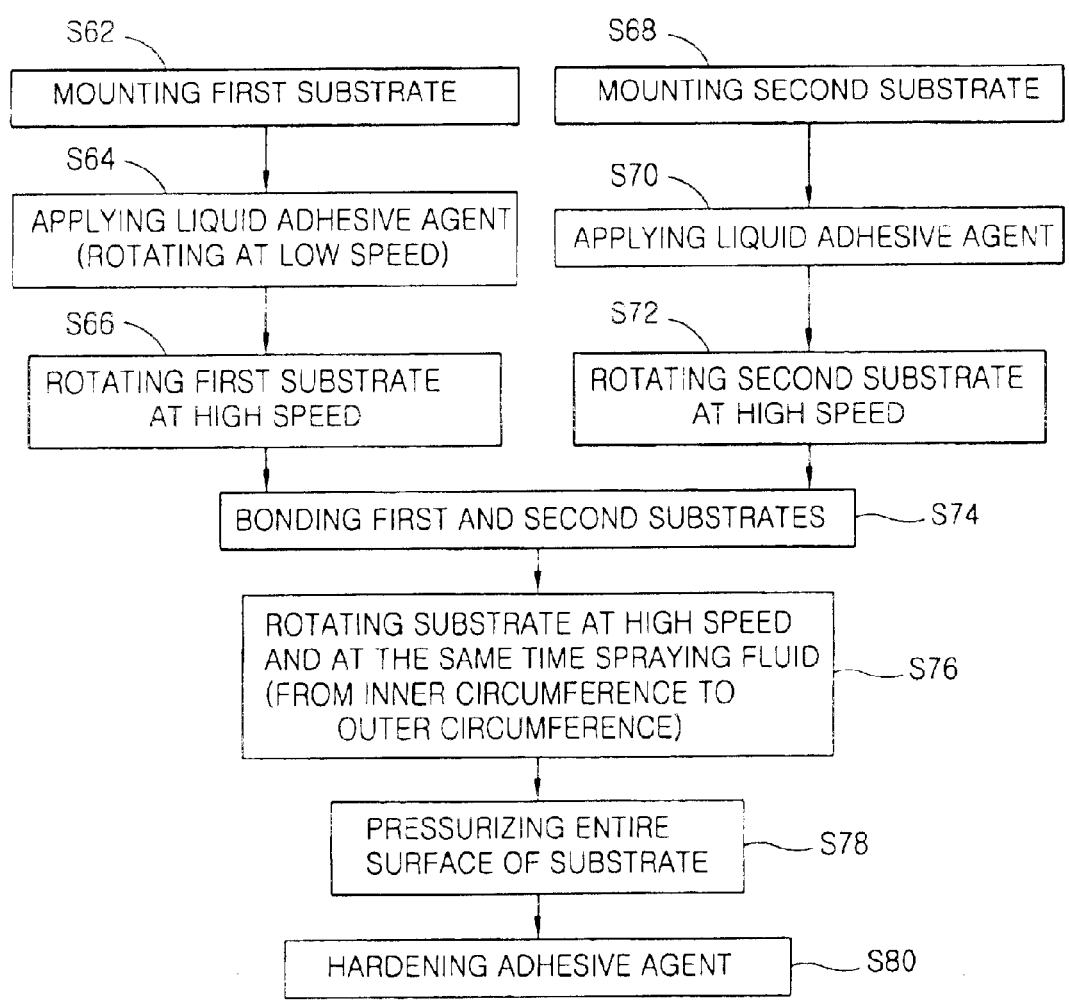
FIG. 10 is a flow chart of another bonding method of an optical disk in accordance with another embodiment of the present invention.

The bonding method of an optical disk of FIG. 10 is featured in that, rather than sequentially mounting the first substrate 44 and the second substrate 48 (steps S51 and S52), an extra disk bonding device (not shown) is provided to perform the steps (S62 and S68) of mounting the first substrate 44 and the second substrate 48 and then a bonding step of the first substrate 44 and the second substrate 48 is performed.

The bonding method of an optical disk of FIG. 10 will now be described in detail.

First Steps (S62, S68): Mounting the First and the Second Substrate:

The first and second substrates are mounted at an upper surface of the disk support member provided at the extra disk-bonding device.

Second Steps (S64, S70): Applying a Liquid Adhesive Agent (Rotation is Performed at a Low Speed):

According to rotation of a drive motor (not shown) provided at the extra disk bonding device, the first substrate and the second substrate 48 mounted on at the upper surface of the disk support member are rotated at a low speed, during which the liquid adhesive agent 46 is supplied through the first nozzle positioned at upper center of the first substrate 44 and the second substrate 48.

Third Steps (S66, S72): Rotating First and Second Substrates at a High Speed:

The first substrate 44 and the second substrate 48 with the adhesive agent 46 applied thereon are rotated at a high speed.

At this time, the liquid adhesive agent 46 spreads from the central portion to the circumference of the first substrate 44 and the second substrate 48 owing to the centrifugal force according to the rotational force and the viscosity of the adhesive agent 46, so as to be applied with a certain thickness.

The thickness of the liquid adhesive agent layer 46 depends on the combination of the rotation speed of the first substrate 44 and the second substrate 48 being rotated, the viscosity of the adhesive agent and the rotation time.

Fourth Step (S74): Bonding the First and the Second Substrates:

The second substrate 48 with the adhesive agent 46 applied thereon by the separately performed process is mounted at an upper surface of the first substrate 44 with the adhesive agent 46 uniformly applied thereon, so as to bond the first substrate 44 and the second substrate 48.

Fifth Step (S76): Rotating the Substrate at a High Speed and at the Same Time Spraying Compression Air:

The mounted first and second substrates 44 and 48 are rotated at a high speed to spray the compression air through the second nozzle 64 to pressurize the second substrate 48.

In such a case, the second nozzle 64 spraying the compression air is linearly conveyed from the central portion to the circumference of the disk, and as the disk support member 62 is rotated at a high speed, the distribution of the compression pneumatic pressure formed at the upper surface of the second substrate 48 has a spiral form.

Thanks to the compression pneumatic pressure applied in the spiral form, the air or air bubbles trapped at the adhesive agent layer 46 between the first substrate and the second substrate 48 is or are thrust out toward the circumference of the adhesive agent 46, that is, toward the circumference of the disk 62, so that the first substrate 44 and the second substrate 48 are firmly bonded at a high speed without an air trap.

In order to effectively remove an air trap, it is preferred to allow a portion of the applied pneumatic pressure and the formerly applied portion to be overlapped. This is achieved by suitably controlling the rotation speed of the disk support member 62 and the movement speed of the second nozzle 66.

In addition, in order to uniformly apply the pneumatic pressure from the central portion and the circumference of the disk, the rotation speed of the drive motor (not shown) for rotating the disk support member 62 is controlled to be increased or decreased in a constant linear velocity (CLV) method.

Sixth Step (S78): Pressurizing the Entire Surface of the Substrate:

When the pneumatic pressure applied due to the compression air reaches the circumference of the second substrate 48, using the highly pressurized air instantly pressurizes the entire surface of the second substrate 48.

Seventh Step (S80): Hardening an Adhesive Agent:

Ultraviolet rays are radiated through the ultraviolet ray discharge lamp (not shown) formed at an upper side of the second substrate 48 in order to harden the adhesive agent 46 interposed between the first substrate 44 and the second substrate 48.

In addition, as a fluid for generating the pressure, nitrogen may be used instead of air. Using nitrogen is advantageous in that an ultraviolet ray hardening resin, the adhesive agent 46, is prevented from being oxidized, so that the adhesive agent 46 is effectively hardened by the ultraviolet rays.

And, by cooling the disk, the disk can be restrained from deforming due to a temperature increase in the disk when the ultraviolet rays are irradiated thereon.

As stated above, in the bonding method and apparatus of an optical disk in accordance with another embodiment of the present invention, since the pneumatic pressure is applied form the central portion to the circumference of the disk according to lapse of time, the air trap existing at the adhesive agent layer 46 between the first substrate 44 and the second substrate 48 is removed.

Thus, the flatness degradation of the disk due to the air trap can be prevented, and since the entire surface of the disk is pressurized once more with the uniform high pressure, a flatness of the disk is more improved.

As so far described, the thin film bonding method and apparatus of an optical disk has the following advantage.

That is, the compressive force using the fluid having a magnetic force in the thin film bonding proceeds in a spiral form from the central portion to the circumference of the disk according to lapse of time, so that the air trap existing in the adhesive agent can be effectively removed, and thus, the flatness of the disk can be prevented from degradation due to the air trap.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A bonding apparatus for an optical disk comprising:
   a rotational shaft integrally coupled to a drive motor generating a rotational force;
   a disk support member coupled to one side of the rotational shaft, on which a first substrate is mounted;
   a first nozzle positioned at a portion of an upper side of the disk support member to supply an adhesive agent onto an upper surface of the first substrate mounted on the disk support member;
   a pressure supplying means for applying pressure by means of a fluid to the first substrate and a thin film mounted on the first substrate with the adhesive agent therebetween according to lapse of time from the central portion of the disk to its circumference to allow bonding between the first substrate and the thin film to proceed in a spiral; and
   irradiation means for irradiating ultraviolet rays to harden the adhesive agent applied between the first substrate and the thin film.

2. The apparatus of claim 1, wherein the pressure supplying means further comprises:
- a second nozzle for supplying a magnetic suspension containing fine magnetic particles on the thin film;
- a magnetic force generating means movably installed below the first substrate and applying a magnetic compressive force onto the first substrate and the thin film; and
- a guide rail for guiding the magnetic force generating means to be movable in a radial direction of the first substrate.

3. The apparatus of claim 1, wherein when the fluid pressure is applied to the first substrate and the thin film, the drive motor is rotated so that the disk support member can maintain a constant linear velocity.

4. The apparatus of claim 1, wherein the pressure supplying means includes a second nozzle installed movable in the radial direction on the thin film and spraying the fluid on the thin film being rotated at a high speed from the central portion to the circumference thereof.

5. The apparatus of claim 4, wherein air is used as the fluid.

6. The apparatus of claim 4, wherein nitrogen is used as the fluid.

* * * * *